INFORMATION STORAGE APPARATUS
Filed Jan. 23, 1957
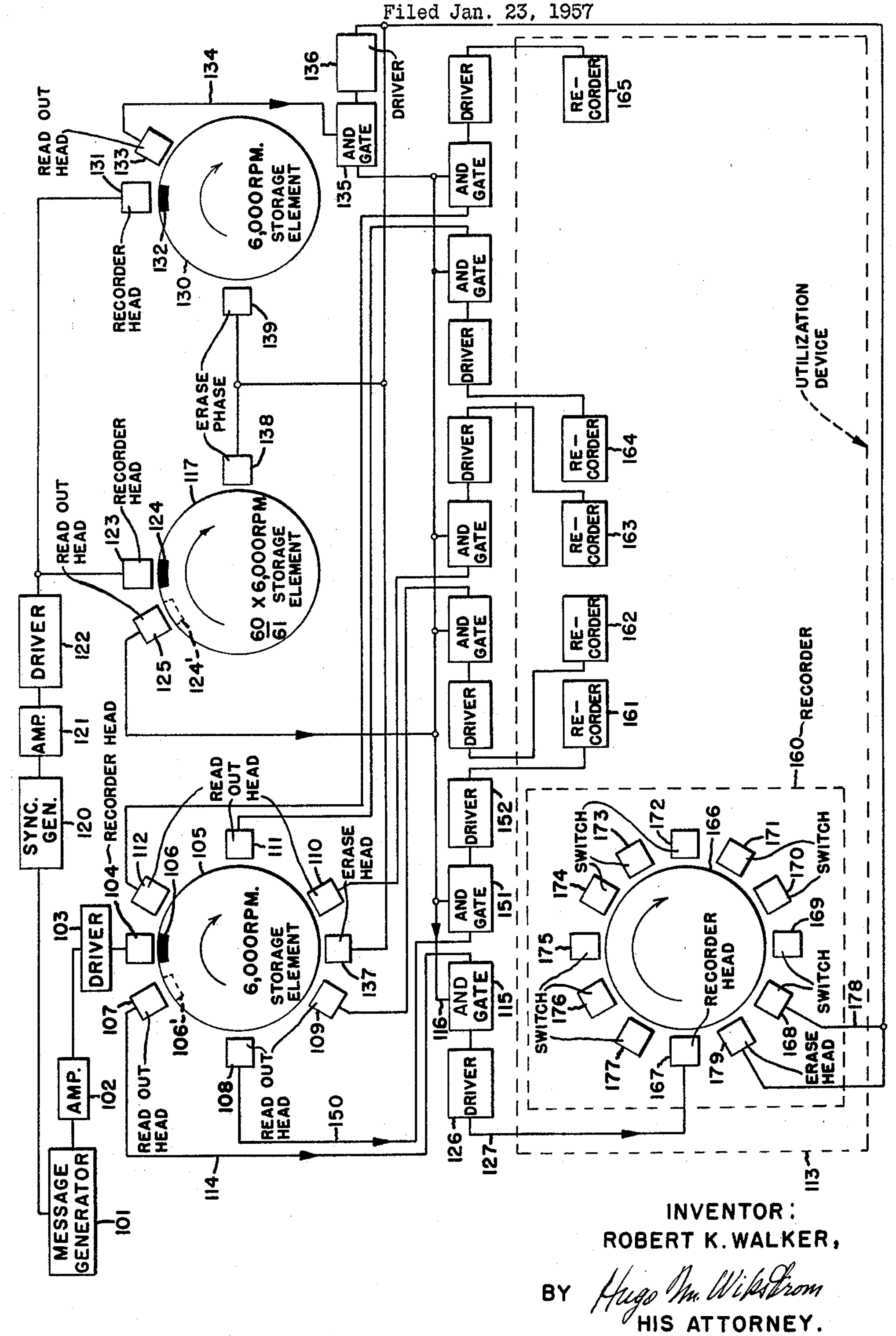
INVENTOR:
ROBERT K. WALKER,
BY Hugo M. Wikstrom
HIS ATTORNEY.

3,013,254
Patented Dec. 12, 1961

3,013,254

INFORMATION STORAGE APPARATUS

Robert Kimball Walker, New Hartford, N.Y., assignor to General Electric Company, a corporation of New York Filed Jan. 23, 1957, Ser. No. 635,700
4 Claims. (Cl. 340—174.1)

This invention relates to a method and apparatus for storing information, and more particularly, to a method and apparatus for the intermediate storage of information transmitted at high rates with subsequent read-out of the information into permanent storage at a lower rate.

In many control and computing applications it has been found that equipment economy can be effected in data transmission by the utilization of time sharing data transmission schemes. In such an arrangement coded information intended for one receiver is transmitted at extremely high rates for a short period of time followed by a longer period of time during which no data is transmitted. However, since the information received is often used for such operations as setting relays in relay matrices, mechanical inertia of the relays prohibits the direct utilization of the information transmitted at such high rates. Even in those applications where it is possible to design equipment capable of final storage or utilization of information transmitted at a high rate, it is often inefficient to design equipments for such high receiving rates due to the long intermessage period during which no information is transmitted.

It is, therefore, one object of my invention to provide a method and means for intermediate storage of information transmitted at high rates with subsequent read-out to storage systems at a slower rate.

It is a further object of my invention to provide an improved information storage system.

It is a further object of my invention to provide an improved signal handling apparatus.

In accordance with one embodiment of the invention, I have provided a rotatable element for intermediate storage of the bits of information contained in the message. At least one recorder head is mounted adjacent to this element and operates to transfer the information bits to the element in the form of magnetic storage. A read-out head is mounted adjacent the element and generates signals in accordance with the information bit adjacent the read-out head. Transfer signals are generated by a read-out head adjacent a rotatable synchronizing pulse storage element. The first transfer signal is generated when the first information bit is adjacent one of the read-out heads. Both the transfer signal and the information signal are applied to an "and" gate. The coincidence of the information signal from the read-out head and the transfer pulse signal operates to transfer the information to the utilization device, such as final storage apparatus. The transfer signals are so timed that on each successive revolution of the rotatable storage element a subsequent information bit is transferred to the storage apparatus, thereby decreasing the rate of information transfer. A third rotatable element is employed to generate an end of message signal after transfer of all the information to the utilization device has been made. The signal is employed to erase signals stored on all three elements, readying the apparatus for receipt of further data.

The features of my invention which I believe to be novel are set forth with particularity in the appended claims. My invention, itself, however, both as to its organization and method of operation, together with other objects and advantages thereof, may best be understood by reference to the following description taken in connection with the accompanying drawing, in which FIGURE 1 is a schematic diagram of one embodiment of my invention.

In FIGURE 1 there is shown a message generator 101 which could be the direct output of a computer when information is cleared therefrom, or a radio receiver receiving information transmitted in a time sharing sequence either by an address code preceding the message or by frequency changes to which the receiver is sensitive. The message is amplified by an amplifier 102 and applied to a driver 103 which drives the recording head 104 to impress the information bits on the periphery of the magnetic storage element 105 which may be a disc, ring, or drum suitable for the storage of information bits in the form of changed magnetic states of the surface or surface coating. For illustrative purposes the storage of the information bit is indicated by the darkened portion 106 of the periphery. The rotatable storage element is driven at a rotational speed dependent upon message length and rate of transmission in order that the message may be properly spaced around the periphery of the element.

Read-out heads 107—112 are provided for transfer of this information to a utilization device 113 at a rate compatible for proper storage therein. The read-out heads may be conventional magnetic read-out heads which generate electrical signals dependent upon the information magnetically stored on the storage element 105.

Referring specifically to the read-out head 107 it will be apparent to those skilled in the art that a signal will be generated as each information bit passes adjacent the read-out head. In order to insure that only the desired information bit be transferred to the utilization device 113, the signal from the read-out head is applied over lead 114 to an "and" gate 115. This "and" gate is a conventional logic circuit which will block transmission of the signal on lead 114 unless there is also a signal applied over lead 116 which is in coincidence with the information signal applied over lead 114. In order to derive the proper signal for application to lead 116 which I have termed a transfer signal, I have provided a second rotatable storage element 117. At the beginning of a message from the message generator 101 a synch generator 120 will generate a synchronizing pulse which is amplified by amplifier 121 and impressed upon the rotatable element 117 by the operation of the driver 122 and the recorder head 123. For illustrative purposes the storage of the synchronizing pulse is illustrated by the darkened section 124 on the periphery of the element 117.

The rotatable element 117 is directly geared to the intermediate storage element 105 and rotates at a predetermined lower, angular velocity than that of the intermediate storage element 105. The derivation of the synchronizing signal, the transfer pulse, from this element is made by the read-out head 125 which applies the transfer pulse to the "and" gate 115 over lead 116. In operation the read-out head 125 is so positioned with respect to the rotational velocity of the transfer storage element 117 and the placement of the read-out head 107 on the intermediate storage element that when the first information bit, illustrated by the dotted portion 106' is adjacent the read-out head, the stored synchronizing pulse, illustrated by the dotted portion 124' will be adjacent the read-out head 125. The coincidence of the two signals derived by the read-out heads 107 and 125 will open the "and" gate to apply a signal to the driver 126 which will transfer the information bit to the utilization device 113 over lead 127.

The rotational speed of the transfer storage element is so adjusted with respect to the information distribution on the intermediate storage element 105 that on each subsequent revolution of the intermediate storage element 105, coincidence between the transfer pulse and the information signal will occur on subsequent information bits.

In order to prepare the apparatus for receipt of another message after the information bits have been completely transferred to the utilization device, a message signal storage element 130 is provided. The synchronizing pulse from driver 122 is impressed by the recorder head 131 on the element 130 as indicated by the darkened portion of the periphery 132. A read-out head 133 is provided to generate a message signal when the same pulse is adjacent the read-out head. This message signal is applied over lead 134 to an "and" gate 135. The speed of the message storage element 130 is so adjusted with respect to the speed of the transfer pulse storage element 117 that coincidence between a transfer signal and a message signal applied to the "and" gate over leads 116 and 134 respectively, occurs only after complete information transfer from intermediate storage of element 105 to the utilization device 113. The coincidence of these two signals opens the gate 135 and causes driver 136 to power the erase heads 137, 138 and 139 to erase the recorder elements 105, 117 and 130 respectively.

It will be apparent to those skilled in the art that the single read-out head 107 could be employed for transfer of the entire message to the utilization device 113. However, it is often desirable to decrease the total time of information transferred from intermediate storage to the utilization device. Requirements for shortening this time will, of course, depend on the particular application and the intermessage time available for transfer of information from intermediate storage to allow reception of additional messages. The embodiment illustrated in FIGURE 1 carries a plurality of read-out heads 108 through 112 to illustrate the use of six parallel read-out circuits. If the message originally stored in intermediate storage consisted of sixty bits of information, the six read-out heads 107 through 112 would divide the message into six portions of ten bits each. In such an embodiment read-out head 108 will be aligned with the eleventh bit of information when the read-out head 107 is aligned with the first bit. Head 108 will apply appropriate signals dependent upon the information bit adjacent thereto over line 150 to its "and" gate 151. Since a transfer pulse is applied through the common lead 116 to the "and" gate 151, as well as the "and" gate 115, the eleventh information bit derived by read-out head 108 will be transferred through driver 152 to the utilization device 113 at the same time that the first bit of information is transferred by head 107. Thereafter head 108 operates to sequentially transfer subsequent digits on successive revolutions of the intermediate storage device 105.

The utilization device may take the form of a wire recorder with appropriately spaced recorder heads for subsequent operations such as computer energizing. When it is desirable to use the information contained in the message to set switch contacts in accordance therewith, each parallel path could drive a recorder 160. For such an arrangement heads 107 through 112 would respectively feed a separate recorder 160 through 165. Each recorder could comprise a rotatable drum 166 on which bits of information are magnetically stored by operation of the signals fed to the recorder head 167 over line 127. Boxes 168 through 177 represent in their broadest form bistable switches held in an inoperative position until a release coil is energized. At that time the switch will be set directly by the magnetic state of the drum 166, corresponding to the stored information bit which is adjacent its respective switch. The switch contacts could be released, if such a recorder is used by the action of the end of message pulse supplied from driver 136 over line 178. An erase head 179 is provided to clear the recorder after setting of the switch contacts in accordance with the information contained in the original message. The details of a recorder of this type are contained in application S.N. 471,209, now Patent 2,912,678 filed November 26, 1954, entitled "Method and Apparatus for Mechanically Storing Information" in the name of Robinson, et al., which application is assigned to the same assignee of the present application.

While it will be apparent to those skilled in the art that the relative speeds of the various elements will depend upon the number of bits in the information, the rate at which the information is transmitted, and the transfer time to final utilization devices, as illustrative example may be helpful for the practice of this invention. In one application a message containing sixty bits of information was transmitted at the rate of 36,000 bits per minute. The rotational speed of the intermediate storage device was 6,000 r.p.m. To insure coincidence of the transfer pulse with the information signal generated by subsequent bits on successive revolutions, the transfer pulse element 117 was rotated at a speed of $60/61\times 6{,}000$ r.p.m. To insure coincidence of the transfer signal with the end of message signal, the message pulse recorder 130 was rotated at 6,000 r.p.m. When used with the recorder 160 the recorder was operated at a speed of $$\frac{60\times 6{,}000}{61\times 24}\text{ r.p.m.}$$

Inasmuch as the transfer rate from intermediate storage 105 to the recorder is made at the rate of 1 bit per revolution, it will be apparent that the information feed rate to the utilization device is reduced to the rate of 6,000 bits per minute, which is compatible with most utilization devices. With six read-out heads operating in parallel, the transfer of the entire sixty bit message from the intermediate storage element 105 can be made in 100 milliseconds.

In general, if $n$ bits are stored on the intermediate storage element 105 which is rotating at "$a$" r.p.m., the rotational speed of the synchronizing signal recorder element 117 should be $$\frac{n}{n+1}\text{“}a\text{”}$$

to allow the intermediate storage element to rotate over revolution plus one information bit before generation of another transfer signal. It will be apparent to those skilled in the art that the relative speeds of the elements and read-out head placement on these elements to generation of the end of message signal will depend upon the number of revolutions of the intermediate storage element necessary to transfer the message to the utilization device.

It will be apparent to those skilled in the art that the utilization device 113 may comprise a wire or tape recorder having a plurality of recording heads appropriately spaced to prevent overlap of the information bits during the transfer operation. It will also be apparent that when using recorder of the type illustrated by figure 160 that it may be more feasible to utilize a large drum having the entire 60 bit message spaced around the periphery thereof. The exact configuration necessary for each application will depend upon the form and space limitations of the application. Suitable pulse stretching methods are available for use when needed, for example, to increase the field strength of stored signals on a drum.

It will also be apparent to those skilled in the art that the use of less than six read-out heads is entirely feasible if the increase in transfer of the message from intermediate storage can be tolerated.

While particular embodiments of the present invention have been shown and described, it will be obvious to those skilled in the art that changes and modifications may be made, without departing from the invention in its broader aspects, and, therefore, the aim in the appended claims is to cover all such changes and modifications that fall within the true spirit and scope of the invention.

What I claim as new and desire to secure by Letters Patent of the United States is:

1. In combination, a first rotatable record means for magnetically storing a message composed of a plurality of information bits received thereby, at least one information read-out means adjacent said first record means for generating a signal in accordance with the information bit adjacent thereto, means for generating a synchronizing pulse at the start of said message, a second rotatable record means coupled to said last named means for magnetically storing said synchronizing pulse, a synchronizing signal read-out means adjacent said second record means for generating a transfer signal when said stored pulse is adjacent thereto, means linking said first and second record means in such a manner that said transfer signal is generated when the first of said information bits is adjacent one of said information read-out means and successive transfer signals are generated as successive bits are adjacent said one of said read-out means on successive revolutions of said first rotatable record means, a utilization device, means responsive to said information signal and said synchronizing signal to couple said information signal to said utilization device only when said information signal coincides with said synchronizing signal.

2. In combination, a first rotatable record means for magnetically storing a message composed of $n$ information bits received thereby, means for generating a synchronizing signal at the beginning of said message, a second rotatable record means coupled to said last named means for magnetically storing said synchronizing signal, at least one information read-out means adjacent said first record means for generating an information signal in accordance with the information bit adjacent thereto, transfer signal read-out means adjacent said second record means for generating a transfer signal when said stored synchronizing signal is adjacent thereto, means coupling said second record means to said first record means to rotate said second record means $n/n+1$ revolutions for each revolution of said first record means, a utilization device, and means responsive to said information signal and said transfer signal to couple said information signal to said utilization device only when said information signal and said transfer signals coincide.

3. In combination, a first rotatable record means for magnetically storing a message composed of a plurality of information bits received thereby, at least one information read-out means adjacent said first record means for generating a signal in accordance with the information bit adjacent thereto, means for generating a synchronizing pulse at the start of said message, a second rotatable record means coupled to said last named means for magnetically storing said synchronizing pulse, a synchronizing signal read-out means adjacent said second record means for generating a transfer signal when said stored pulse is adjacent thereto, means linking said first and second record means to generate one of said transfer signals when the first of said information bits is adjacent one of said information heads and others of said transfer signals as successive bits are adjacent said one of said heads on successive revolutions of said first rotatable record means, a utilization device, means responsive to said information signal and said synchronizing signal to couple said information signal to said utilization device only when said information signal coincides with said synchronizing signal, a third rotatable record means coupled to said synchronizing pulse means for magnetically storing said pulse, a signal read-out means adjacent said third record means for generating a message signal when said stored pulse is adjacent thereto, means linking said first and third record means to generate one of said message signals on each revolution of said revolution of said first record means, means for erasing magnetically stored signals on said first, second and third record means in response to said message signal, and means responsive to both said message and transfer signal to couple said message signal to said erase means only when said message signal and transfer signal coincide.

4. In combination, a first rotatable record means for magnetically storing a message composed of $n$ information bits received thereby, means for generating a synchronizing signal at the beginning of said message, a second rotatable record means coupled to said last named means for magnetically storing said synchronizing signals, at least one information read-out means adjacent said first record means for generating an information signal in accordance with the information bit adjacent thereto, transfer signal read-out means adjacent said second record means for generating a transfer signal when said stored synchronizing signal is adjacent thereto, means coupling said second record means to said first record means to rotate said second record means $$n/n+1$$

revolutions for each revolution of said first record means, a utilization device, means responsive to said information signal and said transfer signal to couple said information signal to said utilization device only when said information signal and said transfer signals coincide, a third rotatable record means coupled to said synchronizing signal generating means for magnetically storing said signal, message signal read-out means adjacent said third record means for generating a message signal when said stored synchronizing signal is adjacent thereto, means coupling said third record means to said first record, means responsive to said message signal for erasing magnetically stored signals on said first, second, and third record means, and means responsive to said transfer signal and said message signal to couple said message signal to said erase means only when said message and transfer signal coincide.

References Cited in the file of this patent

UNITED STATES PATENTS

| | | |
|---|---|---|
| 2,739,299 | Burkhart | Mar. 20, 1956 |
| 2,845,609 | Newman | July 29, 1958 |